United States Patent
Nakashima (10) Patent No.: US 10,991,985 B2
(45) Date of Patent: Apr. 27, 2021

(54) SECONDARY BATTERY (71) Applicant: TOYOTA JIDOSHA KABUSHIKI KAISHA, Toyota (JP)

(72) Inventor: Satoshi Nakashima, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 153 days.

(21) Appl. No.: 16/275,972

(22) Filed: Feb. 14, 2019

(65) Prior Publication Data
US 2019/0260086 A1 Aug. 22, 2019

(30) Foreign Application Priority Data
Feb. 19, 2018 (JP) .............................. JP2018-026686

(51) Int. Cl.
*H01M 10/0585* (2010.01)
*H01M 10/0525* (2010.01)
*H01M 2/04* (2006.01)
*H01M 2/02* (2006.01)

(52) U.S. Cl.
CPC ....... *H01M 10/0585* (2013.01); *H01M 2/024* (2013.01); *H01M 2/043* (2013.01); *H01M 10/0525* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 7,678,501 B2* | 3/2010 | Tomihara | H01M 2/22 429/211 |
| 2009/0169990 A1* | 7/2009 | Gardner | H01M 2/30 429/179 |
| 2010/0081052 A1* | 4/2010 | Morishima | H01M 10/0525 429/211 |
| 2012/0177982 A1* | 7/2012 | Byun | H01M 10/0525 429/163 |
| 2014/0147714 A1* | 5/2014 | Kwak | H01M 10/0431 429/94 |
| 2015/0017517 A1 | 1/2015 | Minagata | |

(Continued)

FOREIGN PATENT DOCUMENTS

| | | |
|---|---|---|
| JP | 2009-016122 A | 1/2009 |
| JP | 2013-175407 A | 9/2013 |
| JP | 2016-115491 A | 6/2016 |

*Primary Examiner* — Rena Dye Cronin
(74) *Attorney, Agent, or Firm* — Sughrue Mion, PLLC (57) ABSTRACT

A secondary battery of sealed structure disclosed herein is provided with a stacked electrode body inside a battery case. At a region closer to a lid body of the battery case when a rectangular positive electrode sheet and rectangular negative electrode sheet that make up the electrode body is bisected with respect to a direction from the lid body to a bottom surface of a case body, a positive electrode collector exposed portion and a negative electrode collector exposed portion, which do not have a positive or negative electrode active material layer, are formed, in the rectangular positive electrode sheet and negative electrode sheet, on the inward side of the rectangular positive and negative electrode sheets, in such a manner that one side of each exposed portion makes up part of an edge, of the positive and negative electrode sheets, neighboring and opposing the lid body.

9 Claims, 7 Drawing Sheets (56) References Cited

U.S. PATENT DOCUMENTS

2016/0020438 A1* 1/2016 Nakashima ....... H01M 10/0525
　　　　　　　　　　　　　　　　　　　　　　　429/153
2017/0187025 A1* 6/2017 Watanabe ......... H01M 10/0413

* cited by examiner

SECONDARY BATTERY

CROSS-REFERENCE TO RELATED APPLICATIONS

The present application claims priority to Japanese Patent Application No. 2018-026686 filed on Feb. 19, 2018, the entire contents whereof are incorporated into the present specification by reference.

BACKGROUND OF THE INVENTION

1. Field of the Invention

The present invention relates to a secondary battery such as a lithium ion secondary battery provided with a stacked electrode body having a structure resulting from alternately stacking a positive electrode and negative electrode across interposed members functioning as separators. More specifically, the present invention relates to a collector structure that is provided inside a battery case.

2. Description of the Related Art

Secondary batteries such as lithium ion secondary batteries, sodium ion secondary batteries and nickel-hydride batteries have come to be suitably used not only as so-called portable power sources in personal computers, mobile terminals and the like, but also, in recent years, as power sources for vehicle drive. In particular lithium ion secondary batteries, which are lightweight and afford high energy density, are preferred as high-output power sources for vehicle drive in electric vehicles (EV), plug-in hybrid vehicles (PHV) and hybrid vehicles (HV), and the demand for lithium ion secondary batteries is thus expected to grow in the future.

Examples of forms of such secondary batteries include secondary batteries having a structure in which a so-called stacked electrode body obtained through alternate stacking of a plurality of rectangular sheet-shaped positive electrodes (hereafter referred to as "positive electrode sheets") and rectangular sheet-shaped negative electrodes (hereafter referred to as "negative electrode sheets") across interposed members functioning as separators, is accommodated inside a square-type (also called box-like) battery case, corresponding to the shape of the electrode body, and the battery case is then sealed. The wording "positive and negative electrodes" may be used hereafter in instances where structures and members on the positive electrode side and on the negative electrode side are referred to collectively.

Various structures have been proposed as collector structures in the interior of the battery cases of such secondary batteries of sealed structure that are provided with a stacked electrode body. Examples include structures in which a respective tab for positive electrode collecting is formed protrusively from one side of each positive electrode sheet, and likewise a tab for negative electrode collecting is formed protrusively from one side of each negative electrode sheet. The tabs for positive electrode collecting and tabs for negative electrode collecting provided in the positive electrode sheets and the negative electrode sheets are stacked at respective ends of the stacked electrode body. The sets of stacked collecting tabs, i.e. a positive electrode collecting tab assembly and a negative electrode collecting tab assembly are joined, by appropriate welding means, to a positive electrode collecting terminal and to a negative electrode collecting terminal, respectively, provided on the inner surfaces of the lid body of the battery case, facing the interior of the case. Electrical connection can be realized thereby between the electrode body and collecting terminals. For instance, Japanese Patent Application Publication Nos. 2013-175407 and 2016-115491 disclose examples of lithium ion secondary batteries of sealed structure provided with a collector structure in which there are utilized such collecting tabs formed protruding from electrode bodies.

SUMMARY

Secondary batteries of sealed structure have several problems, illustrated below, in cases where a collector structure is configured through the use of collecting tabs that protrude from the body portion of a stacked electrode body, as described above.

Specifically, the internal space of the battery case in a secondary battery of sealed structure is limited by the shape of the case. Accordingly, in order to increase the capacity of the battery, a positive electrode active material layer forming portion and a negative electrode active material layer forming portion of the electrode body must be as large as possible, in the interior of the case. When collecting tabs of the positive electrode and the negative electrode are formed protruding from the body portion of the electrode body, it becomes necessary to secure space for forming the tabs in the interior of the battery case. Securing the above space constitutes a factor that limits increases in the size of the positive electrode active material layer forming portion and negative electrode active material layer forming portion that are the body of the electrode body. This is undesirable from the viewpoint of increasing battery capacity in a secondary battery of sealed structure.

It is therefore an object of the present invention, arrived at in order to solve the above problem in secondary batteries of sealed structure, to provide a novel collector structure, of the interior of a case, that allows increasing battery capacity in a secondary battery of sealed structure, and to provide a secondary battery having such a collector structure.

To attain the above goals, the present invention provides the secondary battery below. The secondary battery disclosed herein is a secondary battery having: a stacked electrode body; an electrolyte; and a battery case that accommodates the stacked electrode body and the electrolyte.

The stacked electrode body is a stacked electrode body having a structure resulting from alternately stacking a predetermined number of rectangular positive electrode sheets each having a rectangular positive electrode collector and a positive electrode active material layer formed on the collector, and rectangular negative electrode sheets each having a rectangular negative electrode collector and a negative electrode active material layer formed on the collector, with separator members interposed therebetween.

The case has a case body that accommodates the stacked electrode body and the electrolyte, and a lid body that plugs an opening of the case body. A positive electrode collecting terminal and a negative electrode collecting terminal electrically connected to a positive electrode and a negative electrode, respectively, of the stacked electrode body, are disposed on the case inner surface side of the lid body.

In the secondary battery disclosed herein, at a region closer to the lid body when the stacked electrode body is bisected with respect to a direction from the lid body to a bottom surface of the case body, a positive electrode collector exposed portion and a negative electrode collector exposed portion, which do not have the active material layers, are formed, in the rectangular positive electrode sheet and negative electrode sheet, on the inward side of the rectangular positive and negative electrode sheets, respectively, in such a manner that one side of each exposed portion makes up part of an edge, of the positive and negative electrode sheets, neighboring and opposing the lid body.

The positive electrode collector exposed portions of the positive electrode sheets are stacked on each other, without interposed negative electrode sheets or separator members, thereby constituting a positive electrode collecting portion, and the negative electrode collector exposed portions of the negative electrode sheets are stacked on each other, without interposed positive electrode sheets or separator members, thereby constituting a negative electrode collecting portion.

The positive electrode collecting terminal is electrically connected to the positive electrode collecting portion, and the negative electrode collecting terminal is electrically connected to the negative electrode collecting portion.

According to the above configuration, the secondary battery disclosed herein is a secondary battery of sealed structure in which a stacked electrode body of cuboid shape and formed through superposition of rectangular positive electrode sheets and rectangular negative electrode sheets is accommodated in a battery case body, and an opening of the case body is plugged with a lid body. In the secondary battery disclosed herein, as described above, positive and negative electrode collector exposed portions for constituting the positive and negative electrode collecting portions are formed on the inward side of the rectangular positive and negative electrode sheets that make up the stacked electrode body. In other words, the positive and negative electrode collecting portions in the secondary battery having the present configuration do not protrude beyond the electrode body, as in the conventional positive electrode collecting tabs described above. Accordingly, there is no need for separately securing, inside the battery case, a space for arranging collecting tabs protruding from the body portion of the electrode body.

In the secondary battery disclosed herein, the volume of the interior of the case body can therefore be utilized effectively, and a greater battery capacity can be realized.

In a preferred implementation of the secondary battery disclosed herein, at least one of the positive electrode collector exposed portion and the negative electrode collector exposed portion is a rectangular collector exposed portion, and a slit is formed on a side that constitutes a boundary line with the active material layer, the side being perpendicular to the edge, of the positive or negative electrode sheet, neighboring and opposing the lid body, from among the four sides being edges of the rectangular collector exposed portion.

By virtue of the slits formed in a secondary battery having such a configuration, the positive and negative electrode collector exposed portions can be easily bent in the stacking direction of the positive and negative electrode sheets, from the body portion of the stacked electrode body. As a result, the positive and negative electrode collecting portions can be formed easily through bundling of the positive and negative electrode collector exposed portions in the stacking direction, without excessive stress acting on the body portion of the electrode body. Further, the positive and negative electrode collecting portions that are formed can bend in the stacking direction, and hence the positive and negative electrode collecting portions can be easily connected to the positive and negative electrode collecting terminals.

In another preferred implementation of the secondary battery disclosed herein disclosed herein, the positive electrode collector exposed portion is formed at a first end section of the edge, of the positive electrode sheet, neighboring and opposing the lid body, and the negative electrode collector exposed portion is formed at a second end section of the edge, of the negative electrode sheet, neighboring and opposing the lid body.

In a secondary battery having such a configuration, the positive and negative electrode collecting portions are formed at respective end portions of an edge that neighbors and opposes the lid body, in a stacked electrode body of cuboid shape made up of a stack of rectangular positive and negative electrode sheets. Accordingly, connection between the positive electrode collecting portions and the positive electrode collecting terminal, and between the negative electrode collecting portions and the negative electrode collecting terminal, can be accomplished easily by providing sufficient spacing therebetween. This contributes to increasing battery capacity, since the central region between the positive and negative electrode collector exposed portions at both end portions, in a region along the edge neighboring and opposing the lid body, can be used as a positive electrode active material layer forming portion and as a negative electrode active material layer forming portion.

In another preferred implementation of the secondary battery disclosed herein disclosed herein, the positive electrode collector exposed portion is formed at an inward site, excluding both end sections, of the edge of the positive electrode sheet neighboring and opposing the lid body, and the negative electrode collector exposed portion is formed at an inward site, excluding both end sections, of the edge of the negative electrode sheet neighboring and opposing the lid body.

In a secondary battery having such a configuration, positive and negative electrode collecting portions are formed spaced apart from each other in any one of central regions along the edge, of the positive and negative electrode sheets, neighboring and opposing the lid body. Accordingly, both end sections of the edge of the positive and negative electrode sheets neighboring and opposing the lid body can be formed as a positive electrode active material layer forming portion and as a negative electrode active material layer forming portion having active material layers. That is, a dense structure can be formed in which all four corners of the rectangular electrode body including both end sections of the edge, in the electrode body, neighboring and opposing the bottom surface of the case body, serve as a positive electrode active material layer forming portion and as a negative electrode active material layer forming portion having active material layers. In consequence, this can contribute as a result to increasing battery capacity and also to improve the mechanical strength of the electrode body.

DETAILED DESCRIPTION OF THE PREFERRED EMBODIMENTS

Preferred embodiments of a lithium ion secondary battery will be explained in detail below, with reference to accompanying drawings, as an example of the secondary battery disclosed herein. Any features other than the matter specifically set forth in the present specification and that may be necessary for carrying out the present invention can be regarded as instances of design matter for a person skilled in the art based on known techniques in the technical field in question. The invention can be realized on the basis of the disclosure of the present specification and common technical knowledge in the relevant technical field.

The embodiments below are lithium ion secondary batteries, but the implementation of the present invention is not limited to lithium ion secondary batteries, and the invention can be suitably used also in other secondary batteries, for instance in electrical double layer capacitors, lithium ion capacitors and sodium ion secondary batteries.

The term "lithium ion secondary battery" in the present specification is not limited to so-called nonaqueous electrolyte secondary batteries in which the electrolyte is organic solvent-based. All-solid-state lithium ion secondary batteries in which the electrolyte is made up of a solid, as well as lithium ion polymer secondary batteries the electrolyte whereof is made up of a semi-solid polymer, are typical examples encompassed in the term "lithium ion secondary battery". In the present specification the term "active material" denotes a substance involved in storage and release of charge carriers (for instance lithium ions in a lithium ion secondary battery) on the positive electrode side or the negative electrode side.

As an example of a secondary battery of sealed structure disclosed herein, an explanation follows below on an example of a lithium ion secondary battery of a form in which a stacked electrode body and a nonaqueous electrolyte solution are accommodated in a square case (i.e. of cuboid box-like shape). The dimensional relationships (length, width, thickness and so forth) in the various figures do not reflect actual dimensional relationships. Members and portions that elicit the same effects are denoted with identical reference symbols, and a recurrent explanation thereof may be omitted or simplified.

Figure 1:
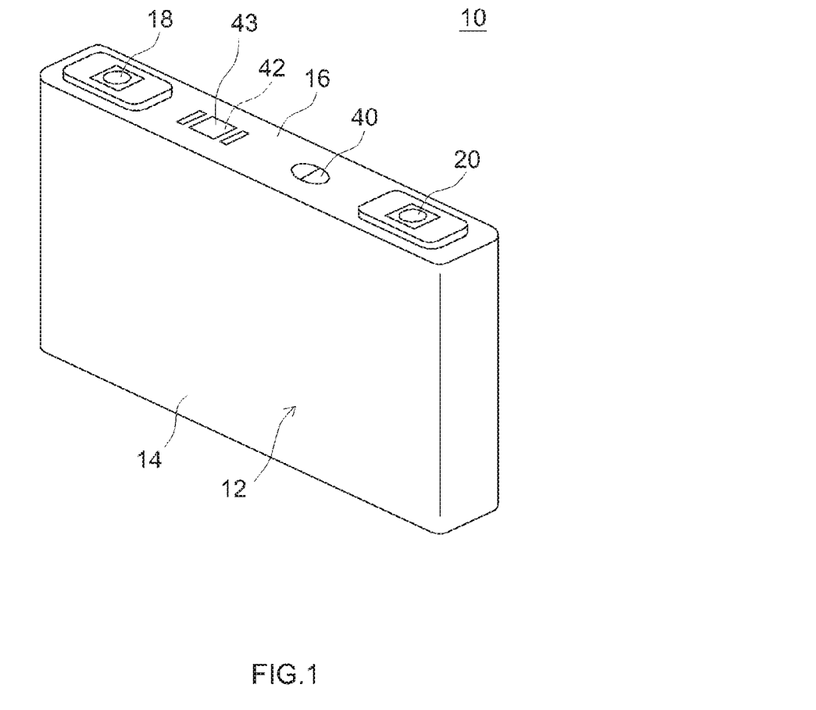
FIG. 1 is a perspective-view diagram illustrating schematically the outer shape of a secondary battery (lithium ion secondary battery) of sealed structure, according to an embodiment.

As illustrated in FIG. 1, the lithium ion secondary battery 10 according to the present embodiment is a secondary battery of sealed structure configured out of a stacked electrode body 50 of flat shape (see FIG. 3) described below, accommodated in a flat square-type battery case 12 corresponding to the shape of the stacked electrode body 50, together with an electrolyte (nonaqueous electrolyte solution) not shown.

The battery case 12 is configured out of a box-shaped case body 14, i.e. having a bottomed cuboid shape, one end of which has an opening (corresponding to a top face, in the ordinary state of use of the secondary battery 10), and a lid body 16 made up of a rectangular plate member and that is attached to the opening of the case body 14, to thereby plug the opening. A battery case 12 of sealed structure, having a hexahedral shape including a pair of case wide surfaces that oppose wide surfaces of the stacked electrode body 50 having a flat shape, and four rectangular side faces (i.e. one top face among the foregoing is made up of the lid body 16) adjacent to the case wide surfaces, is constructed through welding of the lid body 16 to the opening peripheral edge of the case body 14.

Although not particularly limited thereto, a suitable size of a square case of this kind of battery may involve for instance a length of 80 mm to 200 mm of the long sides of the case body 14 and the lid body 16, a length (i.e. thickness of the case 12) of 8 mm to 40 mm of the short sides of the case body 14 and the lid body 16, and a height of 70 mm to 150 mm of the case 12. The size of the stacked electrode body is not particularly limited so long as a size is prescribed that allows the stacked electrode body to be accommodated in the square case that is used.

The materials of the battery case 12 (case body 14 and the lid body 16) are not particularly limited, so long as the materials are the same as those of used in conventional secondary batteries of this type. A preferred battery case 12 is made up mainly of a metallic material that is lightweight and has good thermal conductivity. Examples of such metallic materials include aluminum, stainless steel and nickel-plated steel.

As illustrated in FIG. 1, a negative electrode terminal 18 and a positive electrode terminal 20 for external connection are integrally formed on the outer surface of the lid body 16. Terminals for external connection appropriately shaped in accordance with the form of use of the lithium ion secondary battery 10 can be connected to these external positive and negative electrode terminals 18, 20. A thin-walled gas valve 40 configured so as to relieve internal pressure in the case 12 when the internal pressure rises to a predetermined level or above, and a filling port 42 for supplying a nonaqueous electrolyte solution, are formed between the terminals 18, 20 of the lid body 16. FIG. 1 illustrates a state after injection is complete, with the filling port 42 sealed by a sealing member 43. The mechanism of the gas valve 40 and the form of sealing of the filling port 42 require no special configuration, and may be similar to those of conventional batteries of this type.

Figure 2:
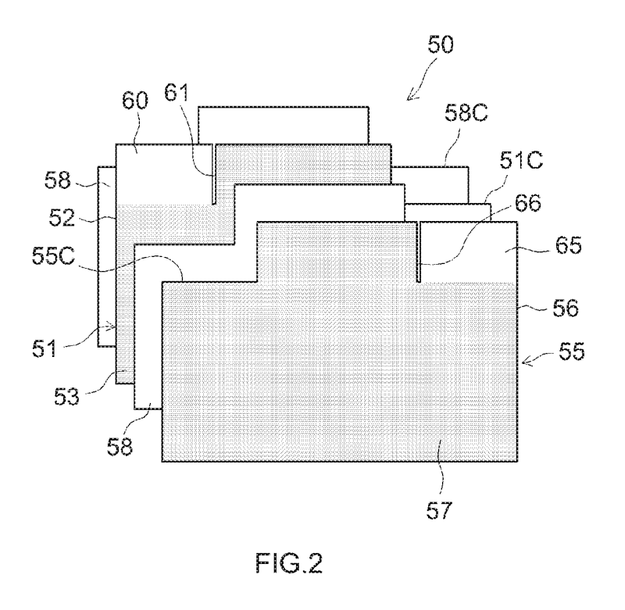
FIG. 2 is an explanatory diagram illustrating schematically positive and negative electrode sheets that make up a stacked electrode body according to an embodiment, together with separators.
Figure 3:
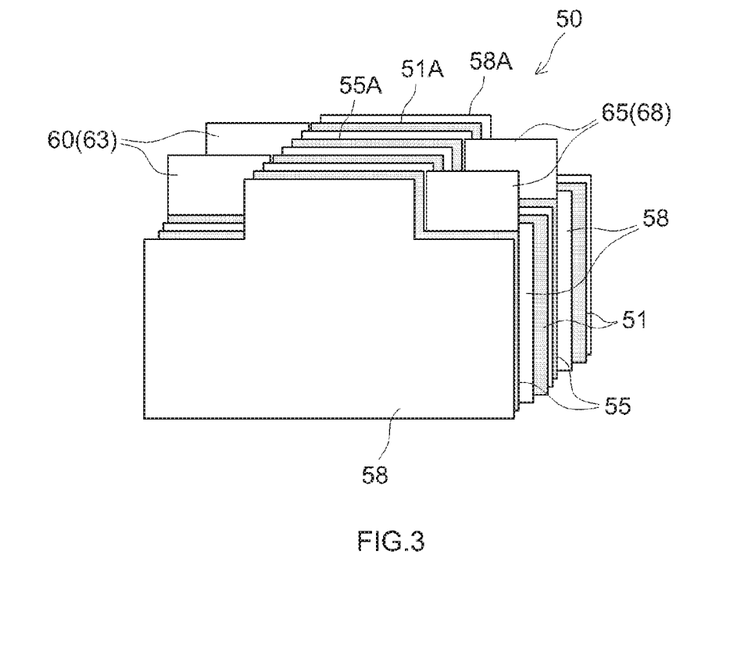
FIG. 3 is a perspective-view diagram illustrating schematically the configuration of a stacked electrode body according to an embodiment.

FIG. 2 and FIG. 3 are perspective-view diagrams illustrating schematically various members that make up a stacked electrode body 50 provided in the interior of the lithium ion secondary battery 10 illustrated in FIG. 1. In the figures, positive electrode sheets 55 and negative electrode sheets 51 are clearly described as one or two sheets each, for the purpose of explaining the stacked electrode body 50, but the actual structure results from stacking alternately a greater number (for instance ten to several dozens) of positive electrode sheets 55 and negative electrode sheets 51, with separators 58 interposed therebetween. For convenience, the frontmost element depicted in FIG. 2 is a positive electrode sheet 55, and the frontmost element depicted in FIG. 3 is a separator 58.

In these figures, the stacked electrode body 50 provided in the lithium ion secondary battery 10 is roughly configured as a whole through alternate stacking of rectangular negative electrode sheets 51 and rectangular positive electrode sheets 55, with separators 58 of similar rectangular sheet shape interposed therebetween. The size of the negative electrode sheets 51 is slightly larger than the size of the positive electrode sheets 55, similarly to conventional batteries of this type. The separators 58 are formed to a rectangular shape of identical or slightly larger size than that of the negative electrode sheets 51.

As illustrated in the figures, in each negative electrode sheet 51 there is formed a negative electrode active material layer 53 on both faces of a rectangular sheet-shaped negative electrode collector 52. In each positive electrode sheet 55 there is formed a positive electrode active material layer 57 on both faces of a rectangular sheet-shaped positive electrode collector 56.

Specifically, the positive and negative electrode active material layers 57, 53 are present along the entirety of the positive and negative electrode sheets 55, 51, respectively, at a region closer to a bottom surface 14B of the case body 14 when the stacked electrode body 50 is bisected with respect to a direction (hereafter referred to as "case depth direction") from the lid body 16 to the bottom surface 14B, while a positive electrode collector exposed portion 65 and a negative electrode collector exposed portion 60, which do not have the positive and negative electrode active material layers 57, 53, are formed on the rectangular positive and negative electrode sheets 55, 51, respectively, at a region close to the lid body 16 in the case depth direction.

Materials and members similar to those used in conventional ordinary lithium ion secondary batteries can be used herein, without particular limitations, as the materials and members that make up the positive and negative electrodes of the stacked electrode body 50.

For instance, the positive electrode collector 56 is made up of a metal material such as aluminum, nickel, titanium or stainless steel. The negative electrode collector 52 is for instance made up of copper (for example a copper foil) or an alloy material having copper as a main constituent.

Separators made up of conventionally known porous sheets can be used, without particular limitations, as the separators 58. Examples thereof include porous sheets (films, nonwoven fabrics or the like) made up of a polyolefin resin such as polyethylene (PE) or polypropylene (PP). Separators with adhesive, capable of enhancing adhesiveness towards opposing positive electrode sheets 51 or negative electrode sheets 55, may be used as the separators 58 that are utilized herein. The separator members need not be such independent members, and may be separator members that bring about electrical insulation similar to that of separator sheets independent from positive and negative electrode sheets, for instance as in the case of insulating layers or solid electrolyte layers (in the case of so-called all-solid-state batteries), provided on the surface of the positive electrode sheets 55 or the negative electrode sheets 51.

Examples of the positive electrode active material include lithium composite metal oxides having for instance a layered structure or a spinel structure. The positive electrode active material layer 57 can contain components other than the positive electrode active material, for instance a conductive material and a binder. Examples of the negative electrode active material include carbon materials such as particulate graphite having a graphite structure (layered structure) at least partially, as well as lithium-transition metal complex oxides and lithium-transition metal complex nitrides. The negative electrode active material layer 53 can contain a binder and the like, other than the negative electrode active material.

A conventionally known nonaqueous electrolyte solution containing a supporting salt in an appropriate nonaqueous solvent can be used, without particular limitations, as the electrolyte interposed between the positive electrode sheets 55 and the negative electrode sheets 51. Alternatively, an oxide-based or sulfide-based solid electrolyte (capable of constituting a separator member) can be used in a case where the lithium ion secondary battery 10 is an all-solid-state battery.

In the present embodiment, a respective negative electrode collector exposed portion 60 at which the negative electrode active material layer 53 is not formed and at which the negative electrode collector 52 is exposed is formed at a first end section of an edge (hereafter referred to as "negative electrode sheet upper side 51A") neighboring and opposing the lid body 16 from among the four edges of each rectangular negative electrode sheets 51, as illustrated in the figures. Specifically, the negative electrode collector exposed portion 60 has overall a rectangular shape and is formed up to a predetermined position on the inward side of the negative electrode sheets 51, i.e. in the case depth direction, so that one side from among the four edges of the exposed portion 60 makes up part of the negative electrode sheet upper side 51A.

Similarly, a respective positive electrode collector exposed portion 65 at which the positive electrode active material layer 57 is not formed and at which the positive electrode collector 56 is exposed is formed at a first end section at an edge neighboring and opposing the lid body 16, from among the four edges of each rectangular positive electrode sheet 55 (hereafter referred to as "positive electrode sheet upper side 55A"). Specifically, the positive electrode collector exposed portion 65 has overall a rectangular shape and is formed up to a predetermined position on the inward side of the positive electrode sheets 55, i.e. in the case depth direction, so that one side from among the four edges of the exposed portion 65 makes up part of the positive electrode sheet upper side 55A. In the present embodiment, as illustrated in the figures, the negative electrode collector exposed portion 60 and the positive electrode collector exposed portion 65 are formed to have substantially the same shapes and sizes.

As illustrated in the figures, in the present embodiment, cutout portions 68, 63 having substantially the same shape and size as those of the exposed portions 65, 60 are formed, at respective end sections on the sides at which the positive and negative electrode collector exposed portions 65, 60 are not formed, in the first end section in the upper sides 55A, 51A of the positive and negative electrode sheets 55, 51. Cutout portions 68C having substantially the same shape and size to those of the positive and negative electrode collector exposed portions 65, 60 are formed, so as to correspond to the positive and negative electrode sheets 55, 51, at both end sections at one side (separator upper side) 58A of the rectangular separators 58 corresponding to the positive and negative electrode sheet upper sides 55A, 51A.

The stacked electrode body 50 according to the present embodiment is thus formed through alternate stacking of a desired number of the positive and negative electrode sheets 55, 51 with separators 58 interposed therebetween. As illustrated in the figures the positive and negative electrode sheets 55, 51 are stacked together with the separators 58 in such a manner that a cutout portion 51C on the negative electrode sheet-side, and the positive electrode collector exposed portion 65, are disposed at the first end section of the positive and negative electrode sheet upper sides 55A, 51A and in such a manner that the negative electrode collector exposed portion 60 and a cutout portion 55C of the positive electrode sheet-side are disposed at the second end section. The separator 58 has cutout portions 58C having shapes similar to the shape of the positive electrode collector exposed portion 65 or the negative electrode collector exposed portion 60 formed at positions, when stacked as described above, opposing the positive electrode collector exposed portion 65 or the negative electrode collector exposed portion 60.

As illustrated in FIG. 3, the positive electrode collector exposed portions 65 of the stacked positive electrode sheets 55 are stacked as a result on each other, without interposed negative electrode sheets 51 or separators 58, thereby constituting respective positive electrode collecting portions 68, and a the negative electrode collector exposed portions 60 of the negative electrode sheets are stacked on each other, without interposed positive electrode sheets 55 or separators 58, thereby constituting respective negative electrode collecting portions 63.

In the present embodiment, as illustrated in FIG. 2, slits 66, 61 are formed on sides that constitute boundary lines with the active material layers 57, 53, the sides being perpendicular to the one side neighboring and opposing the lid body 16 from among the four sides that make up the edges of the positive and negative electrode collector exposed portions 65, 60 (i.e. the one side that makes up part of the positive and negative electrode sheet upper sides 55A, 51A). By virtue of the presence of these slits 66, 61, the positive and negative electrode collector exposed portions 65, 60 can easily bend in the stacking direction of the positive and negative electrode sheets, from the body portion of the stacked electrode body 50, and accordingly the positive and negative electrode collecting portions 68, 63 can be formed easily through bundling of the positive and negative electrode collector exposed portions 65, 60 in the stacking direction, without excessive stress acting on the body portion of the electrode body 50. Also the positive and negative electrode collecting portions 68, 63 that are formed can bend in the stacking direction thanks to the slits 66, 61, and hence the positive and negative electrode collecting portions 68, 63 can be easily connected to the positive and negative electrode collecting terminals described below.

An explanation follows next on a procedure for constructing the lithium ion secondary battery 10 according to the present embodiment, by assembling the stacked electrode body 50 into the lid body 16.

Figure 4:
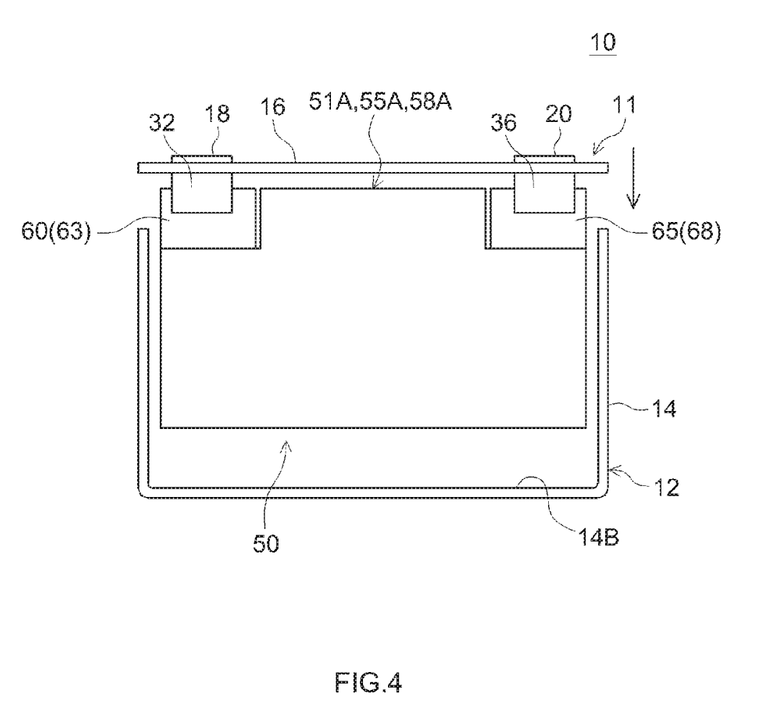
FIG. 4 is a diagram for explaining an assembly of a lid body-integrated type collecting assembly and stacked electrode body, according to an embodiment.
Figure 5A:
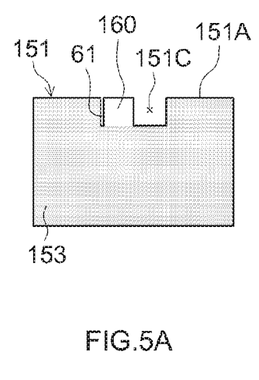
FIGS. 5A to 5C are diagrams illustrating schematically the shapes of positive and negative electrode collector exposed portions of positive and negative electrode sheets according to another embodiment, together with a separator.
Figure 5B:
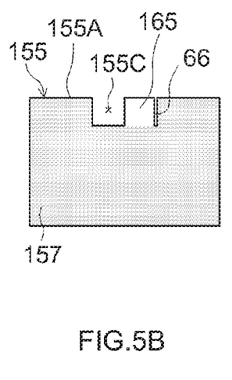
Figure 5C:
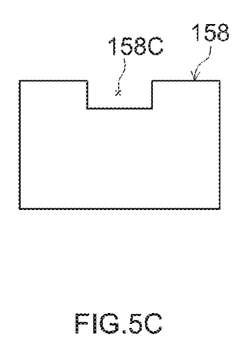
Figure 6A:
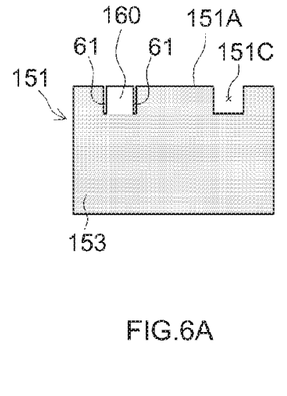
FIGS. 6A to 6C are diagrams illustrating schematically the shapes of positive and negative electrode collector exposed portions of positive and negative electrode sheets according to another embodiment, together with a separator.
Figure 6B:
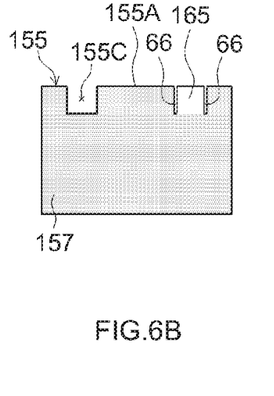
Figure 6C:
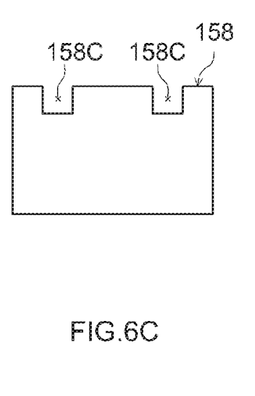

The stacked electrode body 50 configured as described above is accommodated in the case body 14 as illustrated in FIG. 4. On the inner surface side of the lid body 16 there are provided a positive electrode collecting terminal 36 formed as a plate and being electrically connected to the positive electrode terminal 20, and a negative electrode collecting terminal 32 formed as a plate and electrically connected to the negative electrode terminal 18. The positive and negative electrode collecting terminals 36, 32 protrude towards the bottom of the case body 14, from the inner surface of the lid body 16, and are disposed such that the plate surfaces thereof are parallel to the surfaces of the positive and negative electrode collecting portions 68, 63. The positive electrode collecting terminal 36 is joined and electrically connected to the positive electrode collecting portions 68 and the negative electrode collecting terminal 32 is joined and electrically connected to the negative electrode collecting portions 63, by an appropriate welding means (for instance ultrasonic welding or resistance welding). A lid body-integrated type collecting assembly 11 made up of the lid body 16 and the stacked electrode body 50 can be thus obtained through such joining.

Next the stacked electrode body 50 is accommodated in the case body via the opening of the case body 14, in accordance with a known method, and the lid body 16 is welded to the opening of the case body 14. A nonaqueous electrolyte solution is injected through the filling port 42, and the filling port 42 is sealed with the sealing member 43. The lithium ion secondary battery 10 according to the present embodiment becomes constructed as a result. After having been constructed, the battery is subjected to processes of initial charging, aging and so forth according to predetermined conditions, so that a lithium ion secondary battery 10 in a usable state is provided as a result.

As described above, in the lithium ion secondary battery 10 according to the present embodiment, the positive and negative electrode collecting portions 68, 63 are formed at respective end sections of the positive and negative electrode sheet upper sides 55A, 51A, so as to configure part of the positive and negative electrode sheet upper sides 55A, 51A, and accordingly there need not be provided collecting tabs protruding outward from the body portion of the stacked electrode body 50 (i.e. from an inward portion surrounded by the edge of the rectangular positive and negative electrode sheets). In consequence, there is no need for separately securing, inside the battery case 12, a space for arranging collecting tabs that protrude from the body portion of the stacked electrode body 50. The inner volume of the case body 14 can therefore be utilized effectively, as illustrated in the figures, and a greater battery capacity can be realized. In other words, the volume of the positive electrode active material layer forming portion and of the negative electrode active material layer forming portion in the stacked electrode body 50 can be increased with respect to the inner volume of the battery case 12.

Thanks to the slits 66, 61 that are formed, the positive and negative electrode collector exposed portions can be easily bent in the present embodiment in the stacking direction of the positive and negative electrode sheets 55, 51, and accordingly the positive and negative electrode collector exposed portions 65, 60 can be bundled in the stacking direction without excessive stress acting on the electrode body, even in a comparatively thick stacked electrode body.

In the present embodiment, moreover, the positive and negative electrode collecting portions 68, 63 are formed at respective end portions of the positive and negative electrode sheet upper sides 55A, 51A. In consequence, connection between the positive electrode collecting portions 68 and the positive electrode collecting terminal 36, and between the negative electrode collecting portions 63 and the negative electrode collecting terminal 32, can be accomplished easily by providing thus sufficient spacing therebetween. Further, battery capacity can also be increased since the central region along the positive and negative electrode sheet upper sides 55A, 51A can be utilized as a positive electrode active material layer forming portion and a negative electrode active material layer forming portion.

The shape and size of the positive and negative electrode collector exposed portions 65, 60 are not particularly limited, and can be set in accordance with the size of the stacked electrode body 50 and the number of positive and negative electrode sheets that are stacked.

The length from the positive and negative electrode sheet upper sides 55A, 51A in the sheet depth direction can be set to half or less, preferably a third or less, and more preferably a fourth or less, of the length of the positive and negative electrode sheets 55, 51 in that direction. With such values of length in the sheet depth direction, the surface area of the positive and negative electrode collector exposed portions 65, 60 can be made comparatively small and the volume of the positive electrode active material layer forming portion and of the negative electrode active material layer forming portion can be increased accordingly in proportion.

The length of the positive and negative electrode collector exposed portions 65, 60 in a direction along the positive and negative electrode sheet upper sides 55A, 51A is a third or less, preferably a fourth or less, and more preferably a sixth or less, of the length of the positive and negative electrode sheets 55, 51 in that direction. With such values of length along the direction of the positive and negative electrode sheet upper sides 55A, 51A, the surface area of the positive and negative electrode collector exposed portions 65, 60 can be made yet smaller, and the volume of the positive electrode active material layer forming portion and of the negative electrode active material layer forming portion can be increased accordingly in proportion.

A preferred embodiment (first embodiment) of the secondary battery disclosed herein has been explained in detail above, but the collector structure provided by the present invention is not limited to the embodiment described above. For instance, the formation position of the positive and negative electrode collector exposed portions is not limited to both end sections of the positive and negative electrode sheet upper sides 55A, 51A described above, and in another embodiment may adopt a configuration such as that illustrated in FIGS. 5A to 5C, FIGS. 6A to 6C and FIGS. 7A to 7C.

An explanation follows next on the characterizing features of a collector structure according to another embodiment, illustrated in these figures. In the figures, A denotes a negative electrode sheet, B denotes a positive electrode sheet and C denotes a separator.

In the second and third embodiments illustrated in FIGS. 5A, 5B and 5C and FIGS. 6A, 6B and 6C, positive and negative electrode collector exposed portions 165, 160 formed in rectangular positive and negative electrode sheets 155, 151 are formed at inward sites excluding both end sections of the positive and negative electrode sheet upper sides 155A, 151A. In the second embodiment illustrated in FIGS. 5A to 5C, a rectangular positive electrode collector exposed portion 165 and a rectangular negative electrode collector exposed portion 160 similar to those of the above embodiment are formed at a central portion of the positive and negative electrode sheet upper sides 155A, 151A, respectively, in such a manner that the positive and negative electrode sheets 155, 151 are adjacent to each other when stacked with interposed separators 158 therebetween. In the third embodiment illustrated in FIGS. 6A to 6C, a rectangular positive electrode collector exposed portion 165 and a rectangular negative electrode collector exposed portion 160 similar to those in the above embodiment are formed at respective sites slightly closer to the edges of the positive and negative electrode sheet upper sides 155A, 151A rather than at the central portion as described above, in such a manner that the positive electrode collector exposed portion 165 and negative electrode collector exposed portion 160 are slightly spaced from each other when the positive and negative electrode sheets 155, 151 are stacked with interposed separators 158 therebetween.

Therefore, cutout portions 155C, 151C. 158C having shapes similar to those of the positive electrode collector exposed portion 165 and the negative electrode collector exposed portion 160 are formed, in the positive and negative electrode sheets 155, 151 and the separators 158, when stacked as described above, at positions corresponding to the positive electrode collector exposed portion 165 and the negative electrode collector exposed portion 160. As in the above first embodiment, slits can be formed at sides that constitute boundary lines between positive and negative electrode active material layers 157, 153, and the sides being perpendicular to the positive and negative electrode sheet upper sides 155A, 151A.

In the second and third embodiments, both end sections of the positive and negative electrode sheet upper sides 155A, 151A can serve as a positive electrode active material layer forming portion and as a negative electrode active material layer forming portion having the positive and negative electrode active material layers 157, 153. In the present embodiment, thus, a dense structure can be formed in which all four corners that make up the peripheral edge of the electrode body serve as active material layer forming portions. This can contribute as a result to increasing battery capacity, and also to improve the mechanical strength of the electrode body.

Figure 7A:
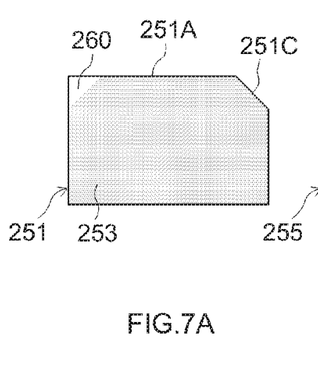
FIGS. 7A to 7C are diagrams illustrating schematically the shapes of positive and negative electrode collector exposed portions of positive and negative electrode sheets according to another embodiment, together with a separator.
Figure 7B:
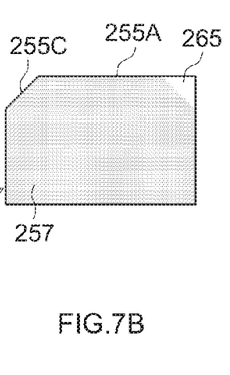
Figure 7C:
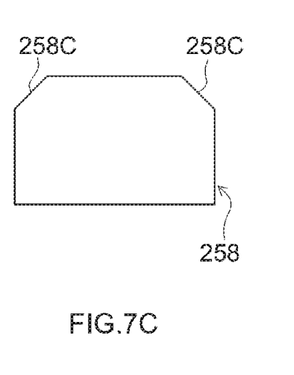

In a fourth embodiment illustrated in FIGS. 7A to 7C, positive and negative electrode collector exposed portions 265, 260 formed on rectangular positive and negative electrode sheets 255, 251 are formed at respective end sections of positive and negative electrode sheet upper sides 255A, 251A. Unlike in the first embodiment described above, in the present embodiment the positive and negative electrode collector exposed portions 265, 260 are formed as triangular shapes encompassing respective corners, as illustrated in the figure. Therefore, cutout portions 255C. 251C, 258C of shape similar to that of the positive electrode collector exposed portion 265 and the negative electrode collector exposed portion 260 are formed, in the positive and negative electrode sheets 255, 251 and the separators 258, at positions corresponding to the positive electrode collector exposed portion 265 and the negative electrode collector exposed portion 260 at the time of stacking.

In the above embodiment, the positive and negative electrode collector exposed portions 265, 260 of triangular shape including respective corners can be easily bent in the stacking direction of the positive and negative electrode sheets 255, 251, without any slits being provided. Accordingly, the positive and negative electrode collector exposed portions 265, 260 can be bundled in the stacking direction without excessive stress acting on the electrode body, even in a comparatively thick stacked electrode body. This contributes also to increasing battery capacity, since the central region along the positive and negative electrode sheet upper sides 255A, 251A can be used as a portion for forming the positive and negative electrode active material layers 257, 253.

As described above, the secondary battery such as a lithium ion secondary battery disclosed herein is provided with a collector structure and a stacked electrode body that allow realizing higher capacity. Therefore, the secondary battery disclosed herein can be suitably used as a power source for vehicle drive (vehicle-mounted secondary battery).

What is claimed is:

1. A secondary battery, comprising:
    a stacked electrode body having a structure resulting from alternately stacking a predetermined number of rectangular positive electrode sheets each having a rectangular positive electrode collector and a positive electrode active material layer formed on the positive electrode collector, and rectangular negative electrode sheets each having a rectangular negative electrode collector and a negative electrode active material layer formed on the negative electrode collector, with separator members interposed therebetween;

an electrolyte; and a battery case that accommodates the stacked electrode body and the electrolyte;

wherein the battery case has a case body that accommodates the stacked electrode body and the electrolyte, and a lid body that plugs an opening of the case body;

a positive electrode collecting terminal and a negative electrode collecting terminal electrically connected to a positive electrode and a negative electrode, respectively, of the stacked electrode body, the positive electrode collecting terminal and the negative electrode collecting terminal being disposed on a case inner surface side of the lid body;

at a region closer to the lid body when the stacked electrode body is bisected with respect to a direction from the lid body to a bottom surface of the case body, a positive electrode collector exposed portion and a negative electrode collector exposed portion, which do not have the active material layers, are formed, in a rectangular positive electrode sheet and a negative electrode sheet, on an inward side of the rectangular positive and negative electrode sheets, respectively, in such a manner that one side of each exposed portion makes up part of an edge, of the positive and negative electrode sheets, neighboring and opposing the lid body;

at said region closer to the lid body, a positive electrode active material layer forming portion and a negative electrode active material layer forming portion are formed, in the rectangular positive electrode sheet and the negative electrode sheet, respectively, in such a manner that one side of both of the active material layer forming portions makes up the other part of said edge, of the positive and negative electrode sheets, neighboring and opposing the lid body;

the positive electrode collector exposed portions of the positive electrode sheets are stacked on each other, without interposing negative electrode sheets or separator members, thereby constituting a positive electrode collecting portion, and the negative electrode collector exposed portions of the negative electrode sheets are stacked on each other, without interposing positive electrode sheets or separator members, thereby constituting a negative electrode collecting portion; and the positive electrode collecting terminal is electrically connected to the positive electrode collecting portion, and the negative electrode collecting terminal is electrically connected to the negative electrode collecting portion.

2. The secondary battery of claim 1, wherein the positive electrode collector exposed portion is formed at a first end section of the edge, of the positive electrode sheet, neighboring and opposing the lid body; and the negative electrode collector exposed portion is formed at a second end section of the edge, of the negative electrode sheet, neighboring and opposing the lid body; and the positive electrode active material layer forming portion and the negative electrode active material layer forming portion are formed at a central section of the edge, between the positive and negative electrode collector exposed portions at both end section of the edge.

3. The secondary battery of claim 1, wherein the positive electrode collector exposed portion is formed at an inward site, excluding both end sections, of the edge of the positive electrode sheet neighboring and opposing the lid body;

the negative electrode collector exposed portion is formed at an inward site, excluding both end sections, of the edge of the negative electrode sheet neighboring and opposing the lid body; and the positive electrode active material layer forming portion and the negative electrode active material layer forming portion are formed at said both end sections of the edge.

4. The secondary battery of claim 1, wherein at least one of the positive electrode collector exposed portion and the negative electrode collector exposed portion is a rectangular collector exposed portion; and a slit is formed on a side that constitutes a boundary line with the active material layer, the side being perpendicular to the edge, of the positive or negative electrode sheet, neighboring and opposing the lid body, from among the four sides being edges of the rectangular collector exposed portion.

5. The secondary battery of claim 4, wherein the positive electrode collector exposed portion is formed at a first end section of the edge, of the positive electrode sheet, neighboring and opposing the lid body;

the negative electrode collector exposed portion is formed at a second end section of the edge, of the negative electrode sheet, neighboring and opposing the lid body; and the positive electrode active material layer forming portion and the negative electrode active material layer forming portion are formed at a central section of the edge, between the positive and negative electrode collector exposed portions at both end section of the edge.

6. The secondary battery of claim 4, wherein the positive electrode collector exposed portion is formed at an inward site, excluding both end sections, of the edge of the positive electrode sheet neighboring and opposing the lid body;

the negative electrode collector exposed portion is formed at an inward site, excluding both end sections, of the edge of the negative electrode sheet neighboring and opposing the lid body; and the positive electrode active material layer forming portion and the negative electrode active material layer forming portion are formed at said both end sections of the edge.

7. A secondary battery, comprising:

a stacked electrode body having a structure resulting from alternately stacking a predetermined number of rectangular positive electrode sheets each having a rectangular positive electrode collector and a positive electrode active material layer formed on the positive electrode collector, and rectangular negative electrode sheets each having a rectangular negative electrode collector and a negative electrode active material layer formed on the negative electrode collector, with separator members interposed therebetween;

an electrolyte; and a battery case that accommodates the stacked electrode body and the electrolyte;

wherein the battery case has a case body that accommodates the stacked electrode body and the electrolyte, and a lid body that plugs an opening of the case body;

a positive electrode collecting terminal and a negative electrode collecting terminal electrically connected to a positive electrode and a negative electrode, respectively, of the stacked electrode body, the positive electrode collecting terminal and the negative electrode collecting terminal being disposed on a case inner surface side of the lid body;

at a region closer to the lid body when the stacked electrode body is bisected with respect to a direction from the lid body to a bottom surface of the case body, a positive electrode collector exposed portion and a negative electrode collector exposed portion, which do not have the active material layers, are formed, in a rectangular positive electrode sheet and a negative electrode sheet, on an inward side of the rectangular positive and negative electrode sheets, respectively, in such a manner that one side of each exposed portion makes up part of an edge, of the positive and negative electrode sheets, neighboring and opposing the lid body;

the positive electrode collector exposed portions of the positive electrode sheets are stacked on each other, without interposing negative electrode sheets or separator members, thereby constituting a positive electrode collecting portion, and the negative electrode collector exposed portions of the negative electrode sheets are stacked on each other, without interposing positive electrode sheets or separator members, thereby constituting a negative electrode collecting portion; and the positive electrode collecting terminal is electrically connected to the positive electrode collecting portion, and the negative electrode collecting terminal is electrically connected to the negative electrode collecting portion, wherein at least one of the positive electrode collector exposed portion and the negative electrode collector exposed portion is a rectangular collector exposed portion; and a slit is formed on a side that constitutes a boundary line with the active material layer, the side being perpendicular to the edge, of the positive or negative electrode sheet, neighboring and opposing the lid body, from among the four sides being edges of the rectangular collector exposed portion.

8. The secondary battery of claim 7, wherein the positive electrode collector exposed portion is formed at a first end section of the edge, of the positive electrode sheet, neighboring and opposing the lid body; and the negative electrode collector exposed portion is formed at a second end section of the edge, of the negative electrode sheet, neighboring and opposing the lid body.

9. The secondary battery of claim 7, wherein the positive electrode collector exposed portion is formed at an inward site, excluding both end sections, of the edge of the positive electrode sheet neighboring and opposing the lid body, and the negative electrode collector exposed portion is formed at an inward site, excluding both end sections, of the edge of the negative electrode sheet neighboring and opposing the lid body.

\* \* \* \* \*